(12) United States Patent
Priyadarshini et al.

(10) Patent No.: US 11,295,370 B1
(45) Date of Patent: Apr. 5, 2022

(54) BUYBACK OFFERS USING PRECALCULATED CACHED USER DATA

(71) Applicant: Amazon Technologies, Inc., Seattle, WA (US)

(72) Inventors: Pallavi Priyadarshini, Bangalore (IN); Jeffrey Ross Panaguiton Damian, Seattle, WA (US); Mark Joseph Tan, Seattle, WA (US); Arpit Gaur, Bangalore (IN)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/158,788

(22) Filed: Jan. 26, 2021

Related U.S. Application Data

(63) Continuation of application No. 15/607,225, filed on May 26, 2017, now abandoned.

(51) Int. Cl.
*G06Q 30/00* (2012.01)
*G06Q 30/06* (2012.01)
*G06Q 30/02* (2012.01)
*G06F 16/00* (2019.01)

(52) U.S. Cl.
CPC ..... *G06Q 30/0633* (2013.01); *G06Q 30/0222* (2013.01); *G06Q 30/0223* (2013.01); *G06Q 30/0637* (2013.01); *G06Q 30/0643* (2013.01); *G06F 16/00* (2019.01)

(58) Field of Classification Search
CPC ........... G06Q 30/0633; G06Q 30/0222; G06Q 30/0233; G06Q 30/0637; G06Q 30/0643
See application file for complete search history.

(56) References Cited

U.S. PATENT DOCUMENTS

| 8,468,091 B1* | 6/2013 | Song | G06Q 30/02 705/39 |
|---|---|---|---|
| 8,571,948 B1* | 10/2013 | Nichols | G08B 13/08 705/28 |
| 2002/0116348 A1* | 8/2002 | Phillips | G06Q 30/0283 705/400 |

(Continued)

OTHER PUBLICATIONS

Li, Kate J., and Susan H. Xu. "The comparison between trade-in and leasing of a product with technology innovations." Omega 54 (2015): 134-146. (Year: 2015).*

(Continued)

*Primary Examiner* — Mila Airapetian
(74) *Attorney, Agent, or Firm* — Lee & Hayes, P.C.

(57) ABSTRACT

A streamlined buyback solution may pre-calculate user data and pre-assess a user inventory, and then may present a buyback offer to a user based on user activity. A user trust assessment may determine the trust score for the user. The buyback assessment may identify items in the user inventory and determine assessed values and opportunity criteria for the items based on data from cost analysis and/or data from user behavior analysis. The opportunity criteria may be based on a model that is trained to analyze user patterns using a learning model. Based on the trust score, assessed values, and opportunity criteria, the user may be presented with a streamlined buyback offer allowing the user to apply the buyback offer value to discount a primary purchase order in a seamless transaction.

20 Claims, 6 Drawing Sheets

(56) References Cited

U.S. PATENT DOCUMENTS

| | | | |
|---|---|---|---|
| 2004/0098318 A1* | 5/2004 | Furukawa | G06Q 30/0601 705/26.1 |
| 2004/0267611 A1 | 12/2004 | Hoerenz | |
| 2007/0106586 A1* | 5/2007 | Mack | G06Q 40/06 705/36 R |
| 2009/0138365 A1* | 5/2009 | Mueller | G06Q 20/12 705/14.19 |
| 2009/0177562 A1 | 7/2009 | Peace et al. | |
| 2011/0060659 A1* | 3/2011 | King | G06Q 30/0641 705/27.1 |
| 2011/0137789 A1 | 6/2011 | Kortina et al. | |
| 2012/0029996 A1* | 2/2012 | Lang | G06Q 30/0226 705/14.27 |
| 2013/0046651 A1* | 2/2013 | Edson | G06Q 30/0255 705/26.4 |
| 2013/0194629 A1* | 8/2013 | Kojima | H04N 1/00413 358/1.15 |
| 2013/0211965 A1* | 8/2013 | Simkin | G06Q 30/0629 705/26.64 |
| 2014/0067596 A1* | 3/2014 | McGovern | G06Q 30/0246 705/26.7 |
| 2014/0095334 A1* | 4/2014 | Barton | G06Q 30/06 705/26.1 |
| 2015/0242870 A1* | 8/2015 | Rothman | G06Q 30/0208 705/14.11 |
| 2016/0227297 A1 | 8/2016 | Bennett et al. | |
| 2017/0004530 A1* | 1/2017 | Ge | G06Q 30/0256 |
| 2017/0206550 A1 | 7/2017 | Hurley et al. | |
| 2018/0114252 A1 | 4/2018 | Bhalgat et al. | |

OTHER PUBLICATIONS

Office Action for U.S. Appl. No. 15/607,225, dated Mar. 30, 2020, Priyadarshini, "Buyback Offers Using Precalculated Cached User Data", 41 Pages.

Office Action for U.S. Appl. No. 15/607,225, dated Jul. 30, 2020, Priyadarshini, "Buyback Offers Using Precalculated Cached User Data", 53 Pages.

* cited by examiner

BUYBACK OFFERS USING PRECALCULATED CACHED USER DATA

RELATED APPLICATIONS

This application claims priority to and is a continuation of U.S. patent application Ser. No. 15/607,225, filed on May 26, 2017, the entire contents of which are incorporated herein by reference.

BACKGROUND

Online technologies have made it easy for users to acquire items without leaving the comforts of their own home. With just a click of a button, items may be deployed from a warehouse and ushered to a user's doorstep in mere hours. However, when it comes time for users to get rid of some of their own items, such as by way of a trade-in, the process is not nearly as streamlined. To gain value for a user's unwanted items, online users would typically have to first find a buyer, then ship the items to a designated location, and wait for receipt of the items to receive some form of credit or currency. This delay may discourage users and may limit feasibility of future purchases until the user receives credits and/or currency.

When conducting a traditional trade-in at a brick-and-mortar store, the physical store may provide more immediate credit and/or currency for the user's items. However, the user may not be aware of better trade-in opportunities available to the user from other sources, and thus may not obtain a best price for a trade-in or other item.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
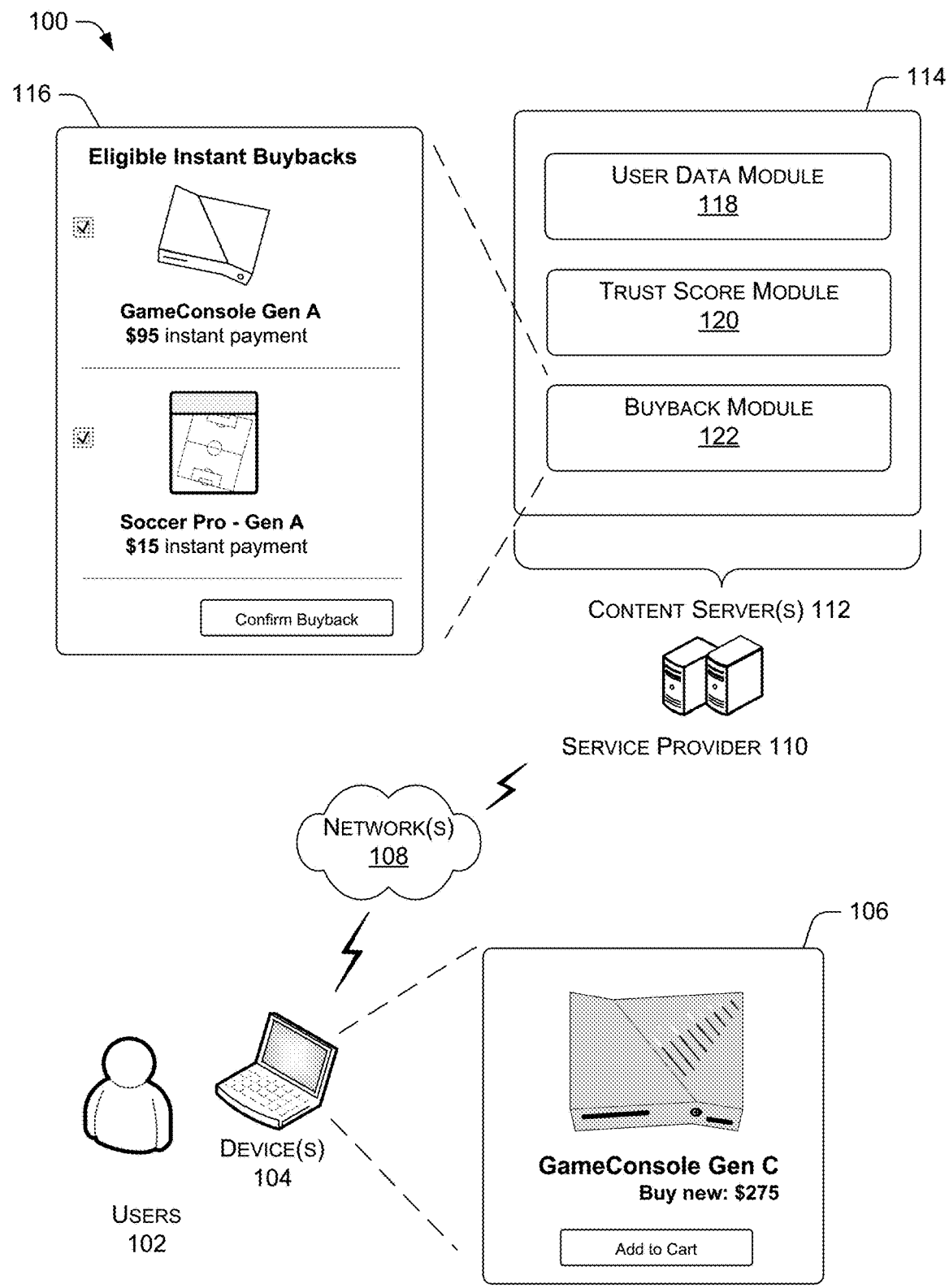
FIG. 1 is a schematic diagram showing an example system for user browsing for an item and a streamlined buyback offer that may be based on the item the user was browsing.

This disclosure is directed, in part, to leveraging pre-calculated cached user data to integrate trading-in items with acquiring items to create a streamlined buyback experience. Some service providers may be in a unique position to know not only the list of items the user has acquired through their services, but to also know the buyback assessed values associated with each of these items. That is, from the list of items the user has acquired, assessed values may be pre-assessed for each item based on the demand for the item in "used" condition, the buyback value, additional landed cost (e.g., shipping cost, customs, taxes, insurance, storage fee, etc.), and other costs or factors associated with trading-in the specific item. For example, a set of used weights may be popular but still have a low assessed value due to the shipping cost, similarly, even if a particular used item is popular, if the service provider has a large inventory of this particular used item, the assessed value may be low due to the storage fee. For the purpose of this discussion, both "trade-in" and "buyback" may be used to describe the transaction of a user selling a tradable item to the service provider, whether it's for credit in the form of cash, gift card, or other currency. The "tradable item" may be previously purchased through the service provider or acquired elsewhere, and may be in varying condition (e.g., unopened, new, like-new, good, used, great, etc.). Additionally, for the purpose of this discussion, a "streamlined buyback offer" may allow the user to apply the value of the buyback offer as instant buyback credit to reduce the price of the current purchase. The user must ship the buyback item as agreed upon after completing the online transaction. The eligibility of a user for a streamlined buyback offer may be based on the user demonstrating creditworthiness.

By having had some history of dealing with certain users, the service provider may be in the position to calculate trust scores for the users, such that the service provider can estimate the creditworthiness of a user if the service provider was to extend buyback credit. In various embodiments, the trust scores may be pre-calculated based on a variety of factors such as successful past transactions, the duration of membership, and/or having a valid payment instrument on the account. In some embodiments, the service provider may also provide a marketplace for users (merchants) to list their own new or used inventory and the feedback data collected for the individual users may be leveraged for trust scores. By pre-calculating the user trust scores, pre-assessing at least a part of the user's known inventory, and caching the pre-computed data, the service provider may reduce latency and avoid overloading the backend system while interacting with the user. This could result in a better user experience by providing not only buyback opportunities the user may not be aware of, but also a streamlined process to complete the buyback transaction with the purchase transaction. Additionally, with the streamlined buyback process, because the steps of adding items and completing transactions for both the primary purchase and the buyback offer can be performed contemporaneously, the user does not have to navigate away to a dedicated buyback offer page.

The service provider may update the trust scores and/or assessed values at various points following a transaction. As discussed above, a trust score may be based on successful past transactions, the duration of membership, and/or having a valid payment instrument on the account. In some embodiments, the user's trust score may be updated following a number of successful buyback transactions. For example, after a buyback item arrives at the service provider's warehouse, the item may be inspected to determine if the item meets the agreed upon minimum buyback condition, and the user's trust score may increase or decrease based on the item condition. In other examples, the user's trust score may drop drastically following a predetermined number of failed buyback transactions due to the user's failure to perform according to agreement. The assessed values may be assessed following a purchase transaction and repeated at various time interval.

In various embodiments, the service provider may train a machine learning model or other possible models to extract one or more predictive criteria to tailor buyback opportunities for individual users. For illustrative purposes, the one or more predictive criteria for buyback opportunities may be related to, but are not limited to, other items or accessories for recently traded-in items, upgrades to newer devices, similarity to other frequently traded-in items, optimal buyback value, top selling items, and launch of new items. A service provider may already have a large pool of data from existing users related to buying habits of users and various machine learning models to recommend new items for users to purchase. Additionally, a service provider that provides buyback opportunities may also have data related to buyback habits of some users. The service provider may leverage different sets of user data and market data to further extract predictors to identify likely buyback opportunities and generate opportunity criteria based on the predictors and assign weights to each opportunity criteria. The service provider may first identify eligible items having an assessed value above an eligibility threshold and then determining if the eligible items satisfy at least one or more opportunity criteria. In some embodiments, a high assessed value for an item may indicate strong interest for buyback by the service provider, but if the item fails to satisfy any opportunity criteria for the user, this may indicate a lack of motivation for the user to part with the item. The opportunity criteria may leverage data related to item ontology, to known market trends, or to an observed increased number of buybacks for specific items.

The opportunity criteria may guide the service provider to provide a user with one or more opportunities for buyback items. As described above, a machine learning model may identify a plurality of opportunity criteria and assign different weights to each criterion based on how influential the criterion is. If more than one of the items satisfy at least one opportunity criteria, the weights associated with the criteria may be factored in to determine which of the items presents a better opportunity for the user.

As a non-limiting example, a first criterion based on a successor-predecessor model may be assigned a highest weight value if the machine has determined that a user showing interest on a new successor product while owning a used predecessor product as the strongest indicator of the user's motivation to trade-in the used item. A second criterion may be based on a razorblade model, such that a user accepting a buyback offer on a used item may then be interested in buyback offers on tied-products, but is not as strong of a motivation for a user to trade-in the related product. Accordingly, the machine may assign a much higher weight associated with the first criterion over the weight associated with the second criterion. Additionally and/or alternatively, if all items, from a user's inventory list, fails to satisfy a single opportunity criteria, the service provider may simply not clutter up the screen with any recommendation.

In some embodiments, the service provider may receive a search for an item from a user. The recommendation for buyback items may be influenced by the items the user is browsing for based on the relevance of eligible items in the user's inventory to the newly searched items. The search may also satisfy a number of opportunity criteria for the relevant items from the user inventory items. For example, if a user is searching for a Brand A digital single-lens reflex (DSLR) camera, the recommendation for buyback items may be a previously purchased predecessor Brand B DSLR camera. Additionally, if the user's inventory lists a zoom lens that is compatible with the Brand B DSLR camera but not the Brand A DSLR camera, the zoom lens may be also be recommended for buyback.

The techniques and systems described herein may be implemented in a number of ways. Example implementations are provided below with reference to the following figures.

FIG. 1 is a schematic diagram showing an example system 100 for receiving a search for an item to potentially purchase from a user and determining a streamlined buyback offer for tradeable items from the user's inventory that is relevant to the selected item. The system 100 may include users 102 that utilize devices 104, through one or more network(s) 108, to interact with a service provider 110. In some examples, the network(s) 108 may be any type of network known in the art, such as the Internet. Moreover, the service provider 110 and/or the devices 104 may communicatively couple to the network(s) 108 in any manner, such as by a wired or wireless connection. The network(s) 108 may facilitate communication between the content server(s) 112 and/or the devices 104 associated with the users 102.

The service provider 110 may be any entity, server(s), platform, etc., that offers items, for purchase or buyback, for users. In some embodiments, the service provider 110 may also provide items (e.g., products, services, etc.) to consumers on behalf of merchant users. Additionally, the service provider 110 may also provider a real-time bidding engine for merchants to bid on buyback items. In response to the merchant offers from the real-time bidding engine, the service provider 110 may present buyback offers to the users 102 on behalf of the merchants. As shown, the service provider 110 may include one or more content server(s) 112. The content servers(s) 112 may be implemented in a non-distributed computing environment or may be implemented in a distributed computing environment, possibly by running some modules on computing devices or other remotely located devices. The content server(s) 112 may be any type of server, such as a network-accessible server.

In various examples, the service provider 110 may present items to consumers on behalf of itself, the users 102, merchants, and/or other entities. The items may include products, services, digital items, or other types of items. Example products may include, but are not limited to, garments, shoes, jewelry, sporting goods, eyewear, headwear, handbags, toys, furniture, bedding, bathroom accessories, electronics, games, ornaments, furniture, appliances, arts and crafts, or other items that may or may not be tradeable. In at least one example, the service provider 110 described herein may cause one or more user interfaces 106 to be presented to users 102 via devices 104. The user interface(s) 106 may allow users 102 to submit item search requests to service provider 110, among other possible uses.

The service provider 110 may initially retrieve data associated with user 102 from user data module 118 and determine if user 102 is creditworthy based partly on cached trust scores that may be pre-calculated by trust score module 120. If the trust score for user 102 is above a predetermined creditworthy score threshold, the service provider may retrieve a credit limit for streamlined buyback offers. The buyback module 122 may determine if the service provider 110 wants to make any buyback offer for items from a retrieved list of the user's inventory. Although buyback module 122 may identify a long list of buyback eligible items from the user's inventory, the service provider 110 may provide buyback offers 116 to the user 102 based on the relevance to the item search request submitted through user interface(s) 106. The service provider 110 may sort the buy offers 116 in order based on the relevance. Additionally, the service provider 110 may trim the list of buyback offers based on the credit limit for streamlined buyback offers as determined by the trust score module 120, based on interface space constraints, or based on predetermined item-to-display limit constraints.

The users 102 (e.g., consumers, merchants, etc.) may interact with the service provider 110 via a site (i.e., a website), a service provider application, a brick-and-mortar location, a self-service interface, a self-service merchant portal, or in any other manner.

In some embodiments, users 102 may interact with the service provider 110 to acquire one or more items through the user interface 106. In various examples, the users may be any individuals, merchants, and/or entities that are a source or a distributor of items that may be acquired by the consumers. For example, the users may include entities that provide products or services to consumers, which may be offered or promoted directly by the users or by the service provider 110 or on behalf of the users. The users (e.g., merchants) may also offer those items via an intermediary marketplace through the service provider. The users may provide items to the consumers with the assistance of the one or more devices 104, which may include any type of communication device. In some examples, the service provider 110 may generate and present user interfaces to prompt a user to trade-in items based on a user activity such as signing onto the service provider's page, or based on a user submitting a search request for an item to purchase. For the purpose of this discussion, such user interfaces are referred to herein as "listing pages." Listing pages may display items available for purchase based on search request received from users, as well as listing the streamlined buyback offers available to the user, as illustrated and discussed in FIG. 4, below.

In at least one example, user may interact with the service provider 110 to both acquire one or more items that are offered for acquisition and trade-in (or sell back) one or more items from the user's inventory in the same transaction and/or during a same user session. In some examples, the service provider 110 may generate and present user interfaces for presenting confirmation for one or more selected items and/or one or more buyback items to a user, as illustrated and discussed in FIG. 5, below. For the purpose of this discussion, these user interfaces are referred to herein as "checkout pages".

In some examples, the users 102 may operate corresponding devices 104 to perform various functions associated with the devices 104, which may include at least some of the operations and/or modules discussed above with respect to the service provider 110.

In at least one configuration, the content server(s) 112 may include any components that may be used to facilitate interaction between the service provider 110 and the devices 104. For example, content server(s) 112 may include a user data module 118, a trust score module 120, and a buyback module 122.

The user data module 118 may receive data from the users 102 (e.g., merchants, consumers, etc.). The data may include account data associated with the same user acting as a consumer, a merchant, or both. In at least one example, the user data module 118 may receive information associated with merchants such as bank account information, feedback from other users (e.g., item was timely received, item matches listing, item condition, etc.), and merchandise information (e.g., product descriptions, inventory available, price information, etc.). In at least one example, the user data module 118 may receive information associated with consumers such as user information and actions associated with a retail purchase account associated with a consumer (e.g., purchases, sales, items on a saved-items list, exchanges, returns, browsing history, search history, recommendations, feedback on purchases, personal demographic information, location proximity, etc.). The user data module 118 may receive and store inventory information associated with the user's inventory for buyback assessment. The inventory information may initially be populated with items based on the data from the user's purchase account, the user data module 118 may receive information from the user to manually add additional items to the user's inventory, and the user data module 118 may store this received information. Additionally and/or alternatively, the user data module 118 may access and observe user information and actions associated with third party sources and systems (e.g., social networks, professional networks, partner webstore purchases, etc.). The data corresponding to the user information may be mapped to a user profile corresponding to a merchant or consumer that may be stored in a database, cloud storage system, or other data repository.

The trust score module 120 may leverage data received from user data module 118 and determine (or retrieve) a trust score associated with the user 102. The trust score module 120 may pre-calculate the trust score for user 102 and associate the trust score with the user account as cached data. The trust score module 120 may access cached data associated with the user while the user is interacting with the service provider. Additionally and/or alternatively, the trust score module 120 may perform additional trust score calculations based on additional user input. For example, a stored credit card information for a user account may have expired, resulting in calculation of a lower trust score than if the stored credit card information had not expired. In response to the user updating the payment information to a valid unexpired card, the trust score module 120 may calculate a new score based on the updated information.

In various embodiments, the buyback module 122 may utilize item search data and retrieved user data associated with a user account to surface recommendations for buyback offers. The buyback module 122 may determine a product type of interest to a user and retrieve eligible buyback items similarly categorized under this product type or otherwise associated with the product type. Additionally, the buyback module 122 may trim the list of eligible buyback items based on the trust score determined by the trust score module 120 and/or based on other factors as discussed herein.

As a non-limiting example, a user wishing to purchase a new game console may enter a search request for a game console through a user interface. The service provider receiving the search request may recommend the latest model "GameConsole Gen C" to the user. Additionally, the service provider may retrieve the user data and determine that the user is a trusted user who is eligible for streamlined buyback offers up to a $300 credit limit. The service provider may retrieve the user's previously purchased inventory and identify items from the user's inventory as being relevant to the user's search request and determining if the items satisfy any opportunity criteria. Based on the user's interest on a successor item, the service provider may present a buyback offers on a predecessor "GameConsole Gen A" and a related game for that particular game console, "Soccer Pro," which the system knows the user previously acquired. Additionally, because the user is a trusted user with a buyback credit limit of up to $300, and the two items combined are less than the limit amount, the service provider may present offers for both items. Of course, many other examples and/or offers may be provided using similar user interfaces.

Figure 2:
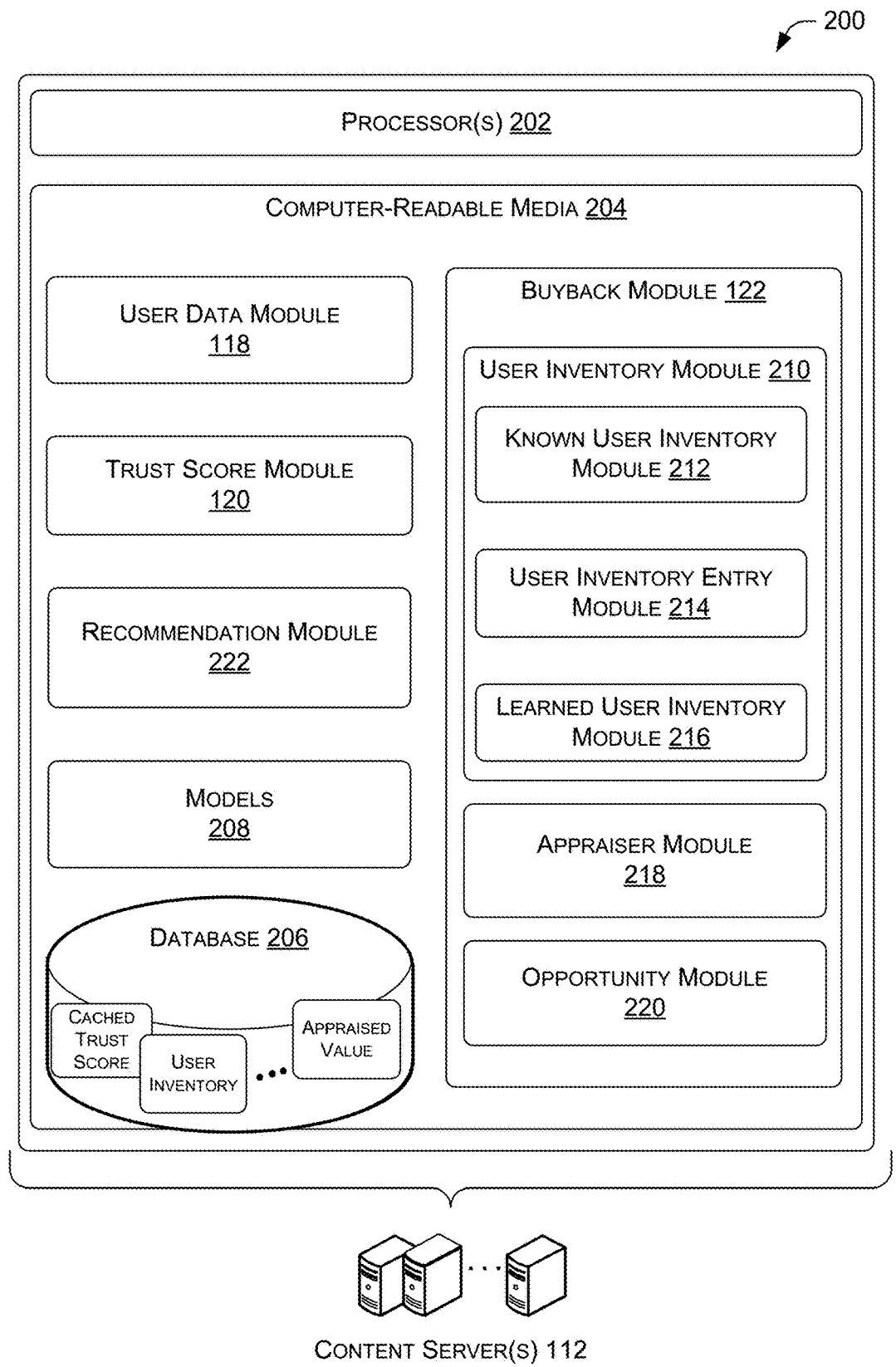
FIG. 2 is a block diagram of an illustrative computing architecture of the content servers.

FIG. 2 is a block diagram of an illustrative computing architecture 200 of the content servers 112. The computing architecture 200 may be implemented in a distributed or non-distributed computing environment.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the system 100.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable media 204 may store the user data module 118, the trust score module 120, the buyback module 122 and associated components, the recommendation module 222, the models 208, and the database 206, which are described in turn. The components may be stored together or in a distributed arrangement.

The user data module 118 may collect data associated with a user from various source and retrieve user data as needed by modules, including collecting feedback data from other users including but not limited to merchants and consumers. The user data module 118 may gather data from other modules that may be stored in database 206. For example, the trust score module may pre-calculate a user's trust score, and the user data module 118 may retrieve this pre-calculated cached trust score to relieve bottleneck at the backend system. Similarly, the user's inventory may be gathered by user inventory module 210 and the buyback eligibility of each item in the inventory may be pre-assessed by the appraiser module 218.

The trust score module 120 may calculate a user's trust score and/or retrieve a cached trust score. To reduce latency, the trust score module 120 may pre-calculate the trust score, as a backend process, based on data associated with the user, including but not limited to, successful past transactions for both purchases and buybacks, valid payment instrument associated with the user account, duration of membership. The trust score module 120 may cache the pre-calculated score, and retrieve it as needed when interacting with the user to enable providing content to users without a delay of recalculating the trust score each time. While the cached trust score may provide some relief from performing costly calculation while the user is interacting with frontend process, the trust score module 120 may re-calculate the score based on receiving user input that may changes the user's credit worthiness. For example, if the user updates an expired payment instrument to a new valid payment instrument, adds additional payment instruments, and/or links other payment accounts, the trust score module 120 may calculate the user's trust score and update the cached data. The trust score module 120 may calculate the user's trust score from time to time, possibly without a triggering event.

In some embodiments, the trust score module 120 may be updated upon receipt of a buyback item or upon lack of receipt of an expected item on a predetermined deadline. If the user accepts a buyback offer but fails to ship the item within an agreed upon time frame, the trust score module 120 may decrease the user's trust score. Additionally, if the user does ship the item within the predetermined time but the received items fails to meet the agreed upon minimum condition standard (e.g., no scratches on CDs, electronics must be in working condition, no cracks on the items, etc.), the trust score module 120 may also decrease the user's trust score. The trust score module 120 may also age the user's trust score based on a lack of activity over a period of time. For example, a user may have a high trust score due to a large number of successful buyback transactions within a short time period, but then stops interacting with service provider for a few years, the trust score module 120 may slowly decrease the trust score after a predetermined threshold period of inactivity. In the example, a "successful buyback transaction" may be based on a number of criteria, including: the item is received within a predetermined time frame, the received item matches the buyback offer description, the item meets the minimum buyback condition, and the item is accepted following inspection. A high trust score, or a trust score above a predetermined threshold high score, may demonstrate creditworthiness of a user, and may proportionally increase the streamlined buyback credit limit for the user. Alternatively, the streamlined buyback credit limit may be based on trust score range brackets. As a non-limiting example, if a trust score range is from 0 to 1000, a credit limit of $200 may be set for trust scores ranging from 300-500, while a credit limit of $300 may be set for trust scores ranging from 500-600, and no credit limit may be set for scores less than a minimum trust score. Thus, the trust score may influence not only a user's eligibility for streamlined buyback offer, but also the streamlined buyback limit.

In various embodiments, the trust score module 120 may determine a minimum trust score threshold for streamlined buyback offers. A service provider may elect to not present any streamlined buyback offers to users with low trust scores, or trust scores below the minimum trust score threshold. However, even with a low trust score, the service provider may allow the user to trade-in items through traditional buyback means, such as having the user bring the item to a brick-and-mortar location, or waiting until the acceptance of the delivered-item before crediting the user's account. The trust score module 120 may continue to monitor and re-calculate the user's trust score based on the non-streamlined traditional buyback transactions.

The buyback module 122 may include the user inventory module 210 and associated components, the appraiser module 218, and the opportunity module 220. Just as the trust score module 120 may pre-calculate the user's trust score as part of the backend process to reduce latency during interaction with a user, the buyback module 122 may similarly gather data and pre-assess the user inventory as part of the backend process and cache the data for retrieval during interaction. The buyback module 122 may determine if the user has any tradable items, or items eligible for trade, in the user inventory for buyback offers. In some embodiments, the buyback module 122 may identify the items in user's inventory with the user inventory module 210, and then determine the assessed values and whether any opportunity criteria were met for the identified items with the appraiser module 218 and opportunity module 220, respectively.

The user inventory module 210 may include known user inventory module 212, user inventory entry module 214, and learned user inventory module 216. The user inventory module 210 gathers data associated with the user inventory to determine all the items in the user's inventory. In some embodiments, the user inventory module 210 may initially populate the user inventory with the known user inventory module 212 retrieving data related to the purchase history of the user, and the known user inventory module 212 may continue to update the user inventory based on new additional purchases. Additionally, the user inventory module 210 may weed out certain categories of items, such as perishable goods or opened single-use items that are not eligible for buyback.

In some embodiments, the user inventory entry module 214 may allow a user to manually enter additional previously purchased items to the user inventory. A user interface may be generated by the user inventory entry module 214 to accept input from the user to manually add items, previously purchased elsewhere, to the user inventory. The manually entered items may be stored as part of the user inventory and/or submitted as a buyback candidates to the service provider. Additionally and/or alternatively, the user inventory entry module 214 may provide a searchable database to the user for items that the service provider may be currently accepting buyback offers for and may include the buyback value. The user inventory entry module 214 may present an option to add the manually entered item to the cart for a streamlined buyback and purchase transaction or an option to save the manually entered item to the user inventory for future buybacks. In some embodiments, the user may use the user inventory entry module 214 to keep the service provider updated on the user's actual current inventory and/or conditions of the items therein.

In various embodiments, learned user inventory module 216 may add one or more learned items to the user inventory. The learned user inventory module 216 may train one or more of the models 208 to classify items in the user inventory that have been identified by known user inventory module 212 or manually added through user inventory entry module 214. Through the machine classification of items in the user inventory, the learned user inventory module 216 may extrapolate possible learned items that the user may also own. Each learned item may be associated with a predictive value based on how a level of certainty that the user owns the learned item. Because a service provider looking for a streamlined buyback process may be similarly motivated to reduce screen clutter as part of improving the user interface, the learned user inventory module 216 may set a higher acceptable precision threshold for the learned items based on the service provider's need. That is, a user may have purchased a certain number of items as gifts, thus a machine looking at the gift items may make a number of incorrect prediction on learned items. The learned user inventory module 216 may disregard a learned item if an associated predictive value is below a precision threshold.

As a non-limiting example, if the known user inventory module 212 previously identified a Brand A compatible camera lens in the user inventory, the learned user inventory module 216 may determine that the user may possibly own a Brand A camera but predictive value for this may be relatively low. The service provider may refrain from presenting a buyback offer for an item that the machine is rather uncertain of whether the user actually owns or not. However, if in addition to the camera lens, the user inventory entry module 214 previously received an entry to add an underwater camera housing unit for a Brand A camera, the learned user inventory module 216 may determine that the user may possibly own a Brand A camera but with a much higher predictive value that is above the precision threshold. The service provider may surface a buyback offer for the Brand A camera identified by the learned user inventory module 216.

The user inventory module 210 may receive input from the user on whether the user still owns a previously purchased item or not. The feedback may be received as part of the user interface presented to the user with a buyback offer. For instance, a user interface may present a buyback offer for a textbook to a user, but the user gave the textbook to a classmate. The user interface may allow the user to provide feedback that the user no longer owns the textbook.

The appraiser module 218 may determine the buyback eligibility of the items in the user inventory and assign assessed values to the items. The assessed value may be indicative of the level of interest a service provider may have in presenting a buyback offer for the item, as this relates to the profitability of the items. A lower assessed value may indicate that the service provider is less interested in presenting a buyback offer for the item. The appraiser module 218 may include various data sets to determine the assessed value for an item. For instance, appraiser module 218 may include a data set related to market conditions, such a current demand and current value for the item, and may include a data set specific to the service provider, such as the service provider's own inventory and sales data, and so on. In some examples, the appraiser module 218 may receive data from a real-time bidding engine that receives bids from merchants. Additionally, the appraiser module 218 may leverage the real-time bidding engine to appraise the items for the service provider and generate assessed values.

In some embodiments, the appraiser module 218 may pre-calculate the potential value of the buyback offer for the items. Using the potential value of the item as a data point, the appraiser module 218 may further include the potential profit margin for the item. In various embodiments, the appraiser module 218 may set a pre-determined percentage value to reduce an item's market value by, as a baseline assessed value. The pre-determined percentage value may vary depending on the item category or type based on certain categories or types of items being more desirable even when used. In some embodiments, the service provider may elect to increase or decrease the pre-determined percentage value for certain buyback items or item categories to further incentivize users to engage in the buyback offer. The baseline assessed value may be reduced by some items having additional costs that greatly influence potential profit margin, for example, shipping cost for extremely heavy items, or insurance for delicate items.

The opportunity module 220 may personalize buyback opportunities for the user based on identifying items in the user inventory that satisfies some opportunity criteria. The user's search data and browsing history may be leveraged to identify items of interest to the user. Some opportunity criteria may be satisfied based on the relationship between a used tradeable item to a new item of interest. The opportunity criteria may indicate the likelihood of a user wanting to part with the tradeable item, or the likelihood the user will view the buyback offer as an opportunity. A used item not satisfying any opportunity criteria may indicate that a user is unlikely to view parting with the used item as an opportunity, while a used item satisfying a few opportunity criteria may indicate that a user is likely to jump at the opportunity to sell the item. In some embodiments, the opportunity module 220 may train a machine learning model that may extracts predictive criteria to make buyback offers recommendations for different users. The machine learning models can include supervised learning algorithms (e.g., convolutional neural network model, artificial neural networks, Bayesian statistics or networks, Gaussian process regression, logistic model trees, support vector machines, etc.), unsupervised learning algorithms (e.g., artificial neural networks, association rule learning, hierarchical clustering, cluster analysis, etc.), deep learning algorithms, and/or any learning algorithms. In at least one example, opportunity module 220 may use past buyback data and user search data sets as input to train one or more of the models 208 (e.g., the classifiers). Data is collected for training the one or more of the models 208 and extracting predictors for criteria that may correlate to a user selling certain items. Some of the predictive criteria for buyback opportunities may include and relate to: other items or accessories for recently traded-in items; upgrades to newer devices; similarity to other frequently traded-in items; optimal buyback value; top selling items; and launch of new items. Although, some buyback recommendation criteria may be based on items relationship criteria as demonstrated by successor-predecessor model, razorblade model, item clustering, item ontology, others may simply be criteria related to user behavior, such as special event dates. For example, some users may be more motivated to accept buyback offers during holiday seasons or right before a family member's birthday.

In various embodiments, the opportunity module 220 may determine that an item satisfies one or more of opportunity criteria based on the user's action with respect to a different item. For instance, if a user recently traded-in a specific item, that user may want to trade-in accessories associated with the specific item. If the user is browsing for an upgraded device, an opportunity criterion for the previous generation device may be satisfied. Based on a market trend or a trend identified by the service provider that users are frequently trading in a certain item, other users owning this certain item may also want to trade it in. Sometimes a user may not even be aware of certain items increasing in value, but a service provider hosting a real-time bidding engine may be able to identify certain items as having optimal buyback value. The opportunity module 220 may determine that the value increase satisfies an opportunity criterion for the item to help surface the item. For example, if a user inventory has an old action figure that recently jumped in price due to the action figure being featured in trending viral video, the buyback value jump may motivate the user to sell the action figure. A service provider may identify top selling items which may also increase the value of an item and motivate a user to part with the item. The launch of a new item may be welcomed with some fanfare, such that a user owning the older version of the newly launched item may more inclined to trade-up the old item. The opportunity module 220 may determine opportunity criteria based on data associated with satisfying the criteria having a correlation with increased buyback behavior. Increased buyback behavior may be demonstrated by a user adding more buyback selections to cart and/or increasing the buyback offer acceptance.

In some embodiments, the opportunity module 220 may receive additional training sets to help refine the one or more of the models 208. For example, following the launch of the streamlined buyback offers, a user's buyback habits may increase due to the ability to apply the buyback credit to the current purchase. Predictors for individual trading habits may be added based on patterns of individuals accepting certain buyback offers. For instance, the model may identify certain users consistently trading-in certain genre of games after a month of purchase, or certain users are identified as being early adopters of trendy electronic devices may consistently trade-in the previous generation of devices.

The database 206 may store at least some data including, but not limited to, data collected from trust score module 120, buyback module 122, and user data module 118, including data associated with user profiles, user information, feedback data, images received from users, stock images. In other examples, the data may be automatically added via a computing device (e.g., content servers 112). User profile(s) may correspond to one or more user profiles associated with the service provider 110. In some examples, a user profile may include information associated with a merchant such as marketplace information and merchandise information associated with a merchant, user information and actions associated with third party sources and systems, feedback for the merchant, etc. In some examples, a user profile may include information associated with a consumer such as user information and actions associated with a retail purchase account associated with a consumer, user information and actions associated with third party sources and systems, feedback data, etc. In additional or alternative examples, at least some of the data may be stored in a cloud storage system or other data repository.

The recommendation module 222 may identify and recommend products to users and such products may be considered products of interest to the users. In some examples, recommendation module 222 may utilize data associated with a retail purchase account associated with the consumer to identify one or more products to recommend to the consumer. For instance, recommendation module 222 may utilize data associated with user information and actions associated with the retail purchase account associated with a consumer (e.g., purchases, sales, items on a saved-items list (i.e., a wish-list), exchanges, returns, browsing history, search history, recommendations, personal demographic information, location proximity, calendar information, etc.) to determine new products to recommend to the consumer. Additionally or alternatively, the recommendation module 222 may utilize data associated with user information and actions associated with third party sources and systems (e.g., social networks, professional networks, partner webstore purchases, etc.) to determine new products to recommend to the consumer. Moreover, in some examples, recommendation module 222 may utilize feedback data to determine new products to recommend to the consumer. One or more of the models 208 may be utilized for determining new products to recommend to consumers leveraging data associated with user information and actions associated with the retail purchase account, data associated with user information and actions associated with third party sources and systems, and/or feedback data. The recommendation module 222 may cause one or more products to be presented in a user interface to a user via a display of a device 104.

The recommendation module 222 may cause one or more buyback offers to be presented in a user interface to a user via a display of a device 104. The one or more products previously identified by the recommendation module 222 as being a product of interest to the user may influence the one or more buyback offers. In particular, the recommendation module 222 may interact with the opportunity module 220 to determine if one or more opportunity criteria is satisfied based on the relationship between user's tradeable items to products of interest. In some examples, a related-product recommendation panel having limited recommendation space may present only buyback offers having assessed values above a predetermine value and satisfying one or more opportunity criteria and/or may present the listings with the highest associated weights first such that the lower weighted offers may require scrolling to view. Additionally, the recommendation module 222 receiving a product search from a user may recommend one or more buyback offers sorted based on the assessed values, opportunity criteria, and relevance to the searched product before presenting the one or more buyback offers to the user.

Additionally and/or alternatively, the recommendation module 222 may cause the recommendations as determined and ranked by recommendation module 222 to be presented to the consumer via a display of a device 104. For instance, the recommendation module 222 may cause the recommendations for new items and buyback offers to be presented to the consumer via a unique user interface that provides functionality for the consumer to view the recommendation, acquire the one or more products, and/or trade-in items associated with the recommendation, via a text message, an email, and/or a push notification.

Figure 3:
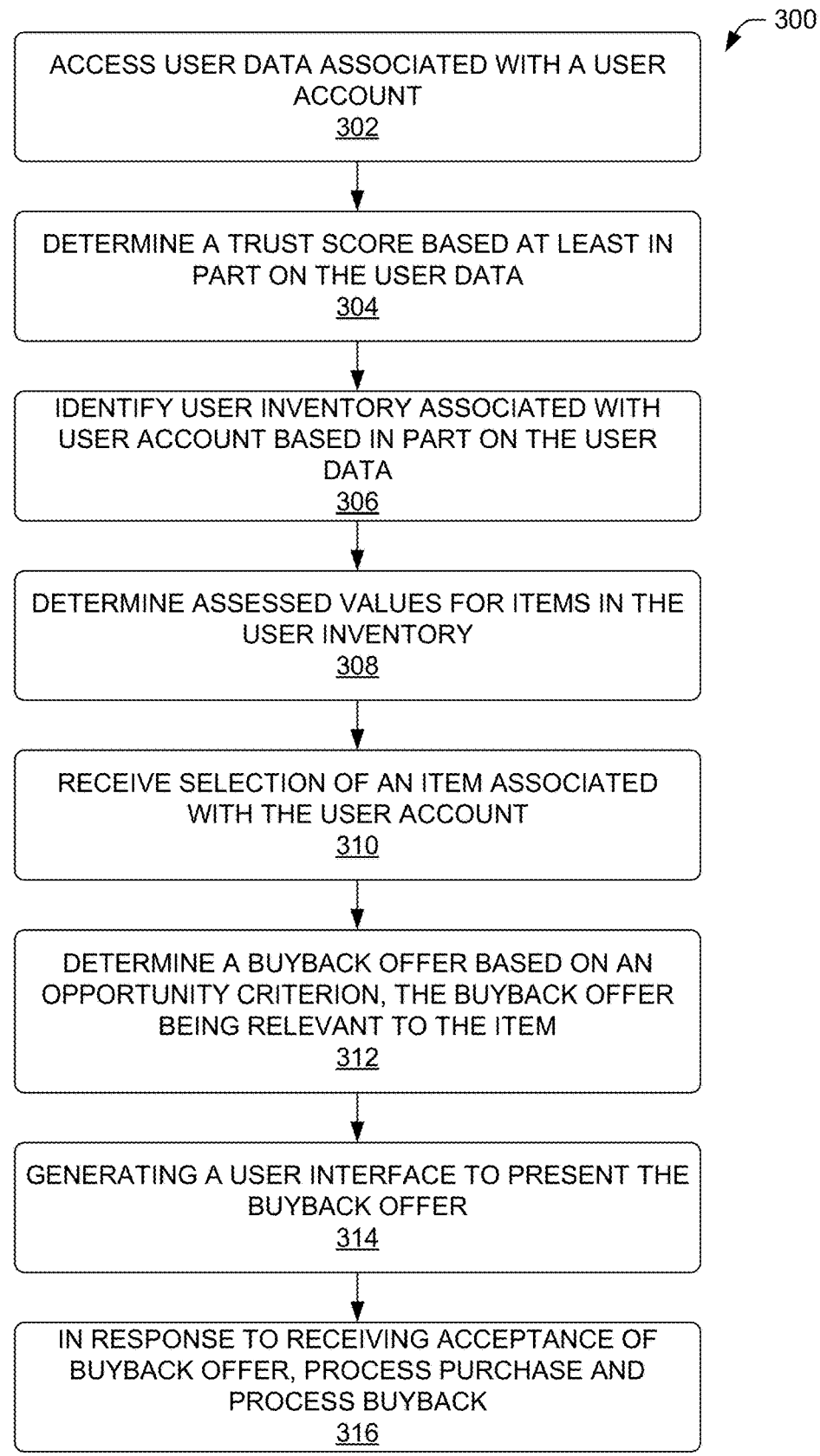
FIG. 3 is a flow diagram of an illustrative process for pre-calculating, pre-processing, and caching user data to determine trust score, user inventory, assessed values related to items in the user inventory, and determining a buyback offer based on user input, opportunity criterion, and the cached data.
Figure 6:
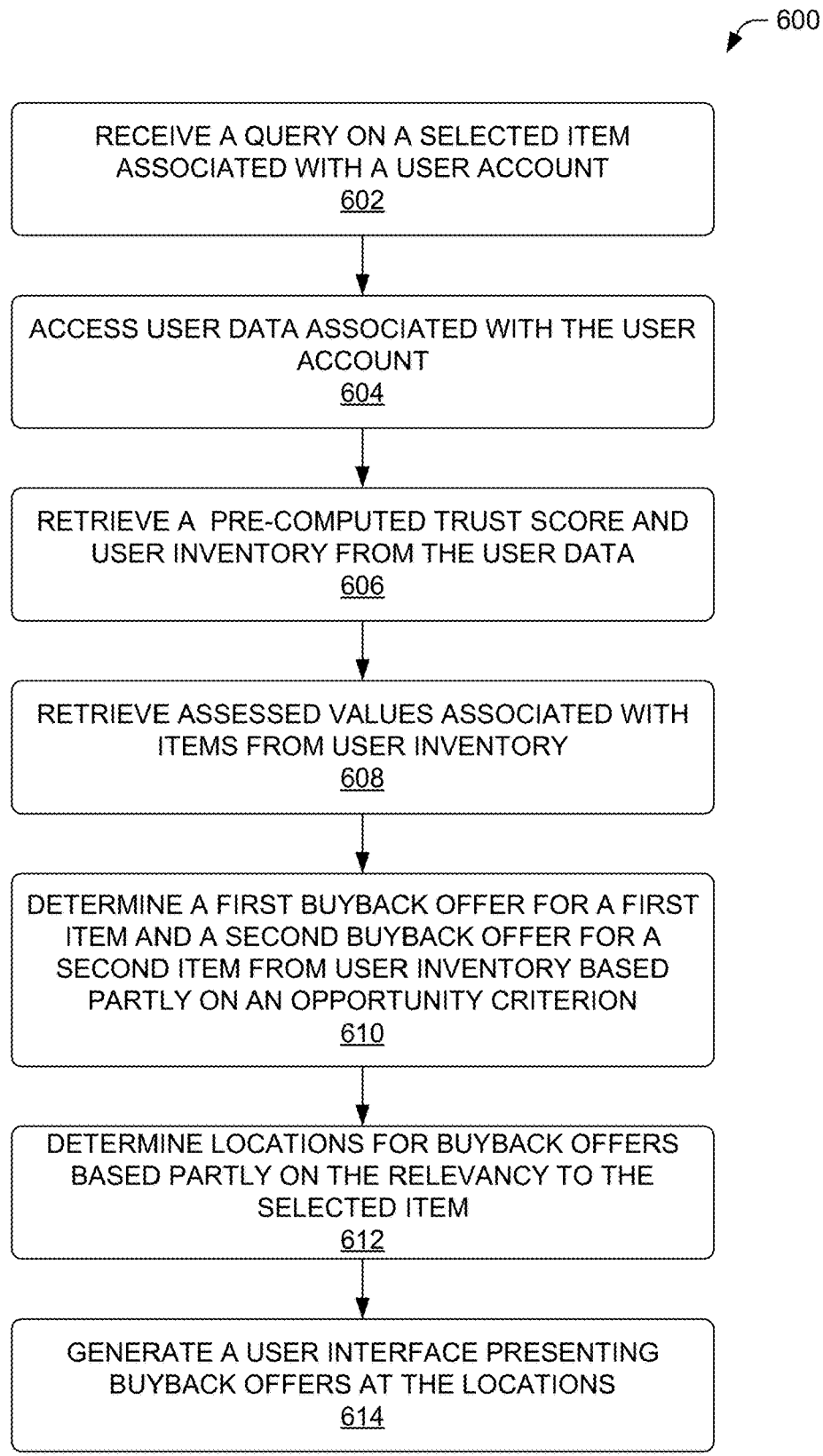
FIG. 6 is a flow diagram of an illustrative process to receive user input for a selected item, access cached data, determine buyback offers for the user based on cached data, determine locations to present the offers, and generate user interface presenting the buyback offers.

FIGS. 3 and 6 are flow diagrams of illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

FIG. 3 is a flow diagram of an illustrative process for accessing user data associated with a user account, pre-processing user data for trust score, user inventory, assessed values, receiving selection of an item from the user account, and determining a buyback offer based on the pre-processed data and opportunity criteria. The process 300 is described with reference to the system 100 and may be performed by the user device 104 and/or in cooperation with any one or more of the content servers 112. Of course, the process 300 (and other processes described herein) may be performed in other similar and/or different environments.

At 302, the user data module 118 may access user data associated with a user account stored in database 206. The user data may be used by trust score module 120 to pre-calculate trust score and used by buyback module 122 to pre-assess user inventory. The trust score and user inventory may be cached and retrieved based on user input.

At 304, the trust score module 120 may pre-calculate the trust score for the user. The trust score may be influenced factors that influence a user's credit worthiness. The factors may include past order history, past buyback history, membership duration, and valid payment instrument associated with the account. A low trust score, or a trust score at or below a predetermined trustworthy threshold, may result in the user not qualifying for buyback offers. Thus, a buyback offer may be provided based on a determination that the trust score associated with the user account is above a predetermined trustworthy threshold.

At 306, the user inventory module 210 may identify the user inventory associated with the user account based at least in part on the user data. The known user inventory module 212 may identify known user inventory based on past purchase data. The user inventory entry module 214 may receive user input for manually adding items to the user inventory. The learned user inventory module 216 may analyze and cluster the user inventory as identified by past purchase and user input. Based on the clustering, the machine may identify one or more learned items. A learned item with a precision ratio, ratio may be expressed as a percentage or fraction, above an acceptable precision threshold may be added to the user inventory to be considered for buyback offers.

At 308, the appraiser module 218 may determine assessed values for the items in the user inventory. The assessed values are associated with how eligible an item is for a buyback offer based on the profitability potential. An item with an assessed value that is at or below a predetermined eligibility threshold value may not be considered for buyback offers at all. The assessed value may be based at least in part of the potential buyback value and various landed cost associated with trading in the item. For example, an item with very low buyback value may be appraised with an equally low assessed value, or an item with a good buyback value but extremely high shipping cost also be assessed with a low assessed value.

At 310, the recommendation module 222 may recommend items of interest to a user and may receive a selection by the user of an item. The selection of the item may trigger a buyback offer based on relevance to the item. Before the buyback offer is presented, if the user's trust score has not been verified to be above a trustworthy threshold, the buyback module 122 may trigger a trust score check. Based on a determination that the trust score is above a predetermined trustworthy threshold, the buyback module 122 may then leverage the selected item data to recommend a buyback offer.

At 312, the buyback module 122 may determine at least one buyback offer for an item from the user inventory based on its relevance to the selected item. The at least one buyback offer may be based on the item satisfying an opportunity criterion. If there is a long list of buyback offers, the list may be trimmed based on lower relevance to the selected item, and the most relevant item may be in the prime viewing location. Additionally and/or alternatively, the long list may be trimmed based on space constraints so that the item with the lowest relevance to the selected item may be removed from the least relevant end of the list until the list fits within the space constraints.

At 314, the recommendation module 222 may generate a user interface to present the buyback offer. As described above, buyback offers may be ranked according to the its relevance to the selected item and/or satisfying an opportunity criterion. The user interface may present the buyback offers according to the ranking and prominence of the viewing locations.

At 316, the recommendation module 222 may respond to a user accepting the buyback offer. Based on the acceptance, the purchase of the selected item and trading in of buyback items may be processed.

Figure 4:
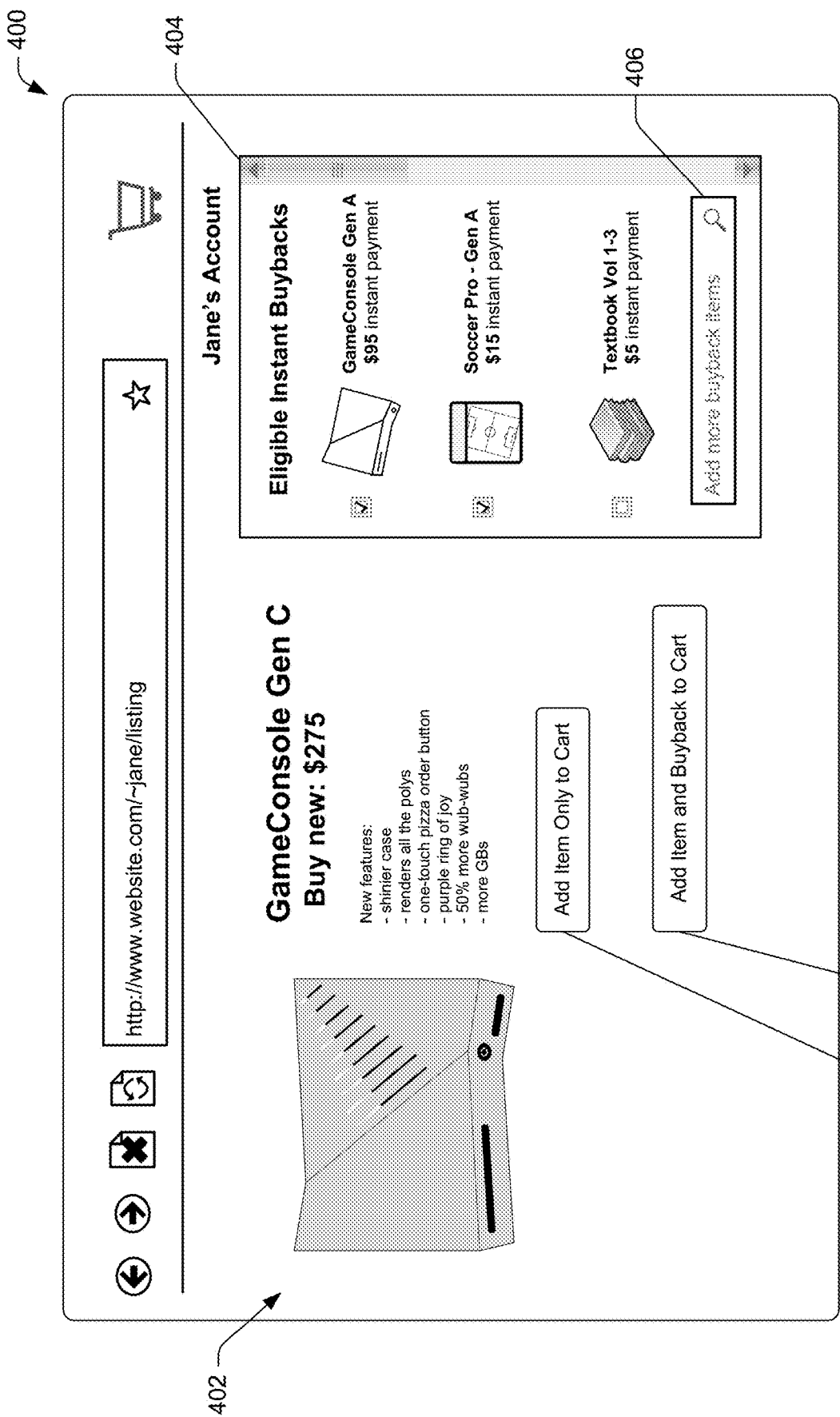
FIG. 4 is a schematic diagram showing an example user interface that may be presented to a user that is eligible for streamlined buyback offers to add new selected item and buyback items to the cart.

FIG. 4 is a schematic diagram showing an example user interface 400 that may be presented to a user, who is eligible for streamlined buyback offers, while the user is still browsing for items to add to the cart, which may include listing items to purchase and trade in. The recommendation module 222 may cause a user interface (e.g. user interface 400) to be presented to a user utilizing any communication channel, such as an e-mail message, a website associated with the service provider 110, a text message, a push notification, a social network site, an application that is associated with the service provider 110 and that resides on device(s) 104 corresponding to the user.

In various embodiments, the user interface 400 may include currently viewed item listing 402, the streamlined buyback listing 404, a user inventory entry 406, an option to add item only 408, and an option to add item and buyback 410. The currently viewed item listing 402 provides the listing details for an item that the user may be interested in purchase.

The streamlined buyback listing 404 may present the buyback offers as determined by the buyback module 122 and recommendation module 222. The streamlined buyback listing 404 may include tradable items related to items that the user is currently browsing for including currently viewed item listing 402. The buyback offers listing 404 may also include one or more tradable items that satisfies one or more opportunity criteria. For example, the buyback offers may prioritize the relevance of buyback offers to the selected item first, and then present additional buyback offers based on relevance of the additional buyback offers to identified items of interest to the user. In some embodiments, the streamlined buyback listing 404 may position the items based on relevance to the viewed item, and then based on the opportunity criteria or the associated criteria weight. For example, the item with highest relevance and/or satisfying the most criteria adjusted by weight may sit in a most prominent location to catch the user's view, and the next highest may sit in the next most prominent location and so on. If the listing was arranged vertically, the top location would be most prominent, with the bottom location being the least prominent. If the listing was arranged horizontally, the leftmost location be the most prominent, with the rightmost location being the least prominent position. The horizontal position of prominence may switch depending on the localized language such that languages read from right to left may have a prominent location on the rightmost location. In either arrangement, items of least relevance or satisfying less criteria adjusted by weight may sitting in the least prominent positions which may require scrolling to view the items. The streamlined buyback listing 404 may allow the user to quickly select or deselect buyback offers.

The user interface 400 may include option to add item only 408 (and not perform a buyback). If the user input received is the option to add item only 408, the buyback offers presented in streamlined buyback listing 404, whether they are selected or not, would be ignored and not added to a transaction.

In at least one embodiment, user interface 400 may include the option to add item and buyback 410. A user input received for option to add item and buyback 410 may add the selected buyback offers presented in streamlined buyback listing 404 to the transaction, along with the currently viewed item.

As a non-limiting example, based at least in part a user, identified as Jane, browsing for a new "GameConsole Gen C," the service provider present a list of buyback offers to Jane. The service provider may retrieve user data associated with Jane and determine that Jane has been a long-time user and has a good trust score (trust score above a predetermined good trust score threshold), which qualifies Jane for streamlined buyback offers. Based at least in part on the relevance to the items Jane is currently browsing for, a machine learning model may determine that Jane may be interested in the opportunity to trade in the predecessor "GameConsole Gen A" and "Soccer Pro for Gen A," and the service provider may provide a user interface to present streamlined buyback offers for the two related items. Additionally, based at least in part on satisfying at least one opportunity criteria, the service provider may also provide a buyback offer for some old textbooks, "Textbook Vol 1-3," in the user inventory. Additional items that satisfied at least one opportunity criteria may also be included in the buyback offer, but will require scrolling to view, as they are either less relevant or satisfy less criteria. Jane may be interested in keeping her old books and select "GameConsole Gen A" and "Soccer Pro for Gen A," but not "Textbook Vol 1-3." The service provider receiving user input to add the item and buyback to cart, will add only the selected items to the cart.

Figure 5:
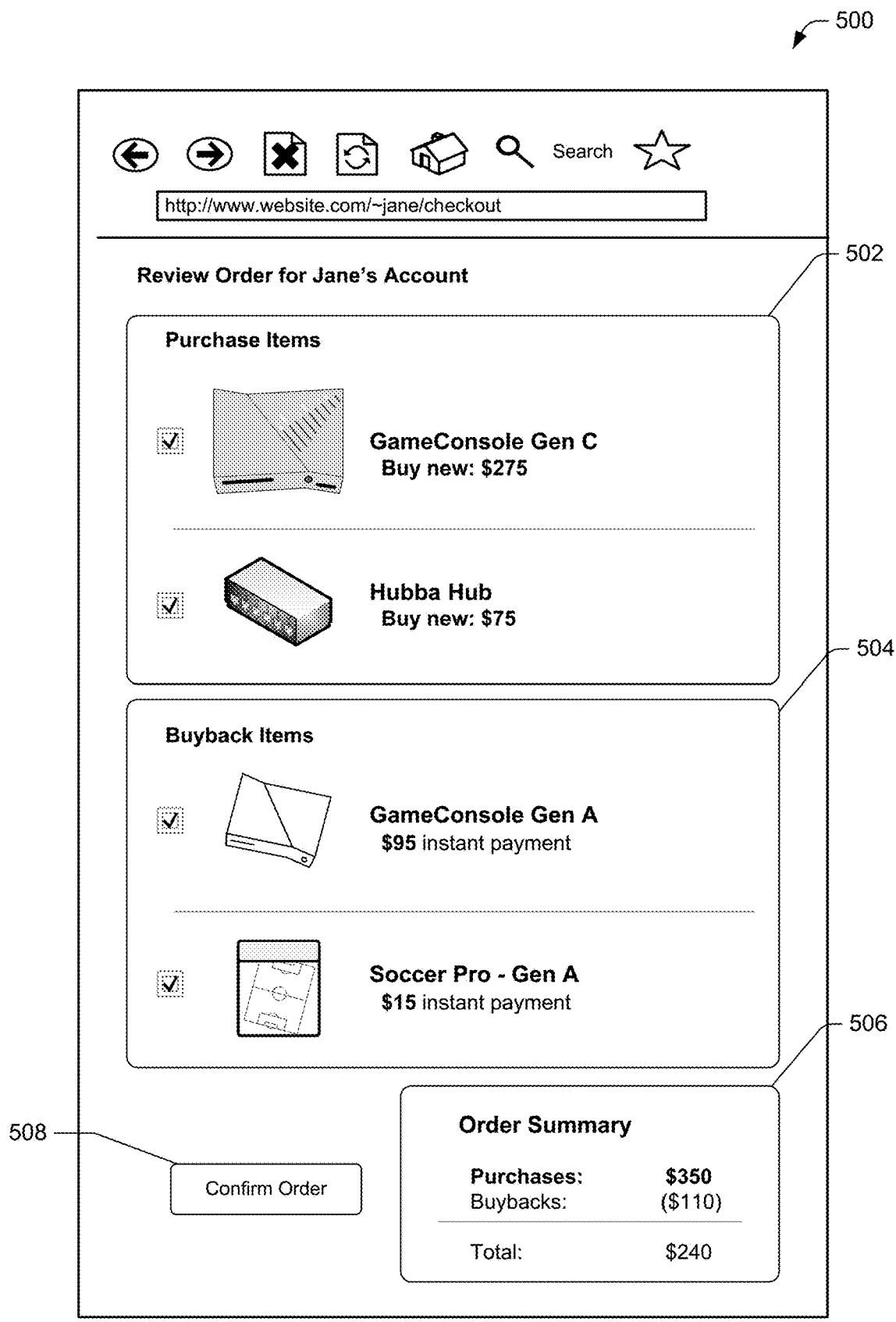
FIG. 5 is a schematic diagram showing an example user interface that may be presented to a user during checkout with streamlined buyback offers to confirm both purchase and buyback items.

FIG. 5 is a schematic diagram showing an example checkout user interface 500 that may be presented to a user, who is eligible for streamlined buyback offers, to confirm both purchase and buyback items. The user input received from user interface 400 may cause a checkout user interface 500 to be presented to a user utilizing any communication channel, such as a website associated with the service provider 110, an application that is associated with the service provider 110 and that resides on device(s) 104 corresponding to the user.

In various embodiments, the checkout user interface 500 may include the selected items review 502, the buyback items review 504, an order summary 506, and a confirmation select 508. The checkout user interface 500 allows the user to verify all the items placed in the cart during the shopping experience and present the overall summary for the items. The overall order summary will present the purchase total, minus the value of any streamlined buyback offer accepted. In some embodiments, if the value of the streamlined buyback offer accepted is more than the actual purchase order, the remaining value may be credited to the user account.

The selected items review 502 may list the selected items the user has added to the cart. The individual selected items that the user has added may be listed with an item description and a listing price to allow the user to confirm the selected items. In some embodiments, the selected items review 502 may include select/deselect options to allow the user to remove the deselected selected item from the purchase order confirmation.

In some embodiments, the buyback items review 504 may list the buyback items the user has added to the cart. The individual buyback items that the user has added may be listed with an item description and a buyback value to allow the user to confirm the buyback items. In some embodiments, the buyback items review 504 may include select/deselect options to allow the user to remove the deselected item from the buyback order confirmation.

In at least one embodiment, the order summary 506 may also include a purchase summary, buyback summary, and total summary. The total summary may reflect the total price for new selected items and reduce that total price by the total buyback value. The order summary 506 may be updated in response to a user input to select/deselect a purchase or buyback item, and the summary for purchase, buyback, and total may be recalculated and updated accordingly.

The confirmation select 508 may confirm the order for the selected items and the buyback items. By confirming the order for selected and buyback items with confirmation select 508, the service provider may process a purchase order and process the acquisition of the buyback item. In some embodiment, the confirmation select 508 may trigger instructions for the user to mail in the buyback items according to the buyback agreement.

As a non-limiting example, based at least in part Jane selecting the option to add item and buyback to cart from the previous user interface, Jane may be presented with a review of Jane's order when she heads to the checkout page. The review page may include her selected items which includes a new console, "GameConsole Gen C," and a new hub, "Hubba Hub." The buyback review may include her selected buyback items, "GameConsole Gen A," and "Soccer Pro—Gen A." The order summary may present a tally of her purchases and buybacks, with the purchase price being discounted by the buyback value, and allow her to confirm the order.

FIG. 6 is a flow diagram of an illustrative process 600 to receive a user query for a selected item, access user data associated with the user, retrieve the pre-computed and pre-assessed scores based on the user data, determine buyback offers for the user, determine ranking for the offers, and generate user interface presenting the buyback offers sorted based on the ranking. The process 600 is described with reference to the system 100 and may be performed by the user device 104 in cooperation with any one or more of the content servers 112. Of course, the process 600 (and other processes described herein) may be performed in other similar and/or different environments.

At 602, the user data module 118 may receive a user query on a selected item from a user account. The user query may be based on a search for item from user or a user clicking on an item of interest as presented by the recommendation module 222. The selected item may be an item that the user is currently browsing for and based on available inventory. The selected item may be acquired as a brand-new item or used item. The recommendation module 222 may leverage the selected item, based on the item itself or the item category, to make one or more recommendations for related selected items or for related buyback offers.

At 604, the user data module 118 may retrieve user data associated with the user account. The user data module 118 may retrieve various pre-calculated and pre-assessed data for further processing based on input received from user. For example, the user is browsing for an item to purchase here, thus based on the user's current browsing and user's past history, the service provider may determine the user's current item interest, and make recommendations accordingly. Additionally, the service provider may leverage data for past purchase history that could be traded-in to help nudge the user to acquire the new item of interest.

At 606, the trust score module 120 may retrieve the pre-computed and cached trust score and the user inventory module 210 may retrieve the user inventory. By leveraging a pre-computed trust score, the service provider saves on additional costly computation and avoids delay in providing content to a user. That is, unless the user changes a credit related data point, the service provider may avoid trust score computation while the user is interacting with the service and instead direct computing power to providing a fast browsing experience. Using the retrieved trust score, the service provider may quickly determine if the trust score is above a predetermined trustworthy threshold, and if the trust score is at or below the threshold, the service provider may avoid additional calculation to for streamlined buyback offers. However, based on a determination that the user's trust score is above a predetermined trustworthy threshold, the service provider may continue to evaluate a buyback offer for the user, by the user inventory module 210 retrieving the user inventory from the user data. The trust score module 120 may also set or retrieve the buyback credit limit for the user, such that the buyback credit limit may set a ceiling for the total value of the buyback offers.

At 608, the appraiser module 218 may retrieve pre-computed and cached assessed values. The service provider may use the assessed values and opportunity criteria for the items in the user inventory to select buyback candidates from. In particular, items have assessed values at or below a predetermined eligibility threshold may be removed or not added at all from a list of buyback candidates. Similarly, items not satisfying any criteria may be removed or not added at all from the list of buyback candidates. In some embodiments, a list of buyback candidates may be selected from the user inventory based on relevancy to the selected item that user performed a query on, and the opportunity criteria may be updated based on the user showing an interest on a certain item category.

At 610, the buyback module 122 may select candidate items from the list of buyback candidates to provide buyback offers on. The selection of candidate items may be based on a determination of the relevance of the candidate item to the selected item, and the assessed value and the opportunity criterion of the candidate item. For example, the buyback module 122 may determine a first buyback offer on a first item based partly on the associated first assessed value and the first item satisfying a first opportunity criterion, and a second buyback offer for a second item based partly on the associated second assessed value and the second item satisfying a second opportunity criterion. The buyback offers may be sorted according to the buyback items' relevance to the selected item. Additionally and/or alternatively, the buyback offers may be sorted according to the weights corresponding the criterion, such that if a first criterion has a corresponding first weight that is higher than the second weight corresponding to a second criterion, than the first item may be ranked first and sorted as being in a more prominent location.

At 612, the buyback module 122 may determine a ranking for the buyback offers. The ranking may be based on at least one of relevance to the selected item, the assessed value, the opportunity criterion, or any combination thereof. The buyback offers may be sorted according to the ranking. As previously discussed, the buyback offers may be limited to a buyback credit limit, thus the sorted list of buyback offers may be trimmed down according the buyback credit limit by removing or hiding items from the bottom of the list until the remaining list of offers to present is within or at the buyback credit limit.

At 614, the recommendation module 222 may generate a user interface to present the buyback offers to the user, the buyback offers may be sorted according to the ranking. If the list of buyback offers is long, some of list may require scrolling to view. The user interface may present an option to allow the user to accept both the purchase and the buyback items.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more non-transitory computer-readable media storing computer executable instructions that, when executed, cause one or more processors to perform operations comprising:
   receiving a query on a selected item associated with a user account;
   accessing user data associated with the user account;
   pre-computing a trust score from the user data;
   determining, based at least in part on the trust score, a streamlined buyback limit for the user account;
   determining user inventory based at least in part on the user data;
   determining assessed values associated with one or more tradable items from the user inventory;
   determining a first buyback offer for a first tradable item from the user inventory based at least in part on the streamlined buyback limit, a first assessed value of the assessed values, and the first tradable item satisfying a first opportunity criterion, the first tradable item having a first relevancy to the selected item;
   determining a second buyback offer for a second tradable item from the user inventory based at least in part on the streamlined buyback limit, a second assessed value of the assessed values, and the second tradable item satisfying a second opportunity criterion, the second tradable item having a second relevancy to the selected item;
   determining a third buyback offer for a third tradable item from the user inventory based at least in part on a third assessed value of the assessed values and the third tradable item satisfying a third opportunity criterion, the third tradable item having a third relevancy to the selected item;
   determining locations for buyback offers based at least in part on the first relevancy, the second relevancy, and the third relevancy to the selected item, the buyback offers including the first buyback offer, the second buyback offer, and the third buyback offer;
   generating a user interface to present the buyback offers at the locations, the user interface presenting a reduced price for the selected item based at least in part on the buyback offers and the streamlined buyback limit, the user interface presenting a control to accept one or more of the buyback offers and purchase the selected item at the reduced price; and
   refraining from presenting the third buyback offer in the user interface based at least in part on space constraints associated with the user interface and the streamlined buyback limit.

2. The one or more non-transitory computer-readable media of claim 1, wherein a first weight associated with the first opportunity criterion is higher than a second weight associated with the second opportunity criterion, and wherein the user interface presents the buyback offers with the first tradable item at a first location and the second tradable item at a second location, the first location being a more prominent location than the second location.

3. The one or more non-transitory computer-readable media of claim 1, wherein the operations further comprise determining that a tradable item satisfies at least one opportunity criteria based at least in part on analyzing the tradable item with respect to at least one data set including at least one of the user data or item data.

4. The one or more non-transitory computer-readable media of claim 3, wherein the operations further comprise training a machine learning model using training data to correlate input tradable items to opportunity criteria and to determine weights associated with the opportunity criteria, the training data including a data set related to at least one of the user data or the item data, and the opportunity criteria indicating predictors associated with increased buyback selections.

5. A computer-implemented method comprising:
   accessing user data associated with a user account;
   pre-computing, by one or more computing devices, a trust score based at least in part on the user data;
   determining, based at least in part on the trust score, a streamlined buyback limit for the user account;
   identifying, by the one or more computing devices, user inventory associated with the user account based at least in part on the user data;
   determining, by the one or more computing devices, assessed values for one or more tradable items from the user inventory;
   determining a selected item based at least in part on received user input associated with the user account;
   determining that at least one of the one or more tradable items from the user inventory satisfy at least one opportunity criteria based at least in part on a relationship between the at least one of the one or more tradable items and the selected item;
   generating a user interface to present one or more buyback offers for the at least one of the one or more tradable items based at least in part on the assessed values and the streamlined buyback limit, the user interface presenting a control to accept the one or more buyback offers and to purchase the selected item at a price reduced by the one or more buyback offers; and
   refraining from presenting at least one of the one or more buyback offers in the user interface based at least in part on space constraints associated with the user interface and the streamlined buyback limit.

6. The computer-implemented method as recited in claim 5, further comprising determining one or more locations on the user interface to present the one or more buyback offers based at least in part on a relevance of the one or more buyback offers to the selected item.

7. The computer-implemented method as recited in claim 5, further comprising determining that a tradable item satisfies the at least one opportunity criteria based at least in part on analyzing at least one data set related to at least one of the user data, item launch cycle, item demand, or user search data.

8. The computer-implemented method as recited in claim 7, where the analyzing the at least one data set comprises training a machine learning model using training data to correlate input tradable items to opportunity criteria and to determine weights associated with the opportunity criteria, the training data including a data set related to at least one of the user data or item data, and the opportunity criteria indicating predictors associated with increased buyback selections.

9. The computer-implemented method as recited in claim 5, wherein the trust score is further based at least in part on cached credit worthiness data, the cached credit worthiness data being pre-computed based at least in part on data including at least one of a past order history, a valid payment instrument, or membership duration associated with the user account.

10. The computer-implemented method as recited in claim 5, wherein the determining the assessed values is based at least in part on analyzing a current value of the one or more tradable items.

11. The computer-implemented method as recited in claim 10, wherein the determining the assessed values is further based at least in part on a service provider's current inventory of the one or more tradable items.

12. The computer-implemented method as recited in claim 5, wherein determining the streamlined buyback limit is based at least in part on a difference between the trust score and a predetermined trustworthy threshold.

13. The computer-implemented method as recited in claim 5, wherein a first tradable item from the one or more tradable items satisfies a first opportunity criterion, wherein a second tradable item from the one or more tradable items satisfies a second opportunity criterion, wherein a first weight associated with the first opportunity criterion is higher than a second weight associated with the second opportunity criterion, and wherein the user interface presents the one or more buyback offers with the first tradable item at a first location and the second tradable item at a second location, the first location being a more prominent location than the second location.

14. The computer-implemented method as recited in claim 5, wherein the identifying the user inventory comprises:
   identifying a plurality of items from the user inventory based at least in part on purchase history associated with the user account;
   performing clustering on the plurality of items;
   predicting a learned item for the user inventory based at least in part on the clustering; and
   generating the user interface to receive user input to add at least one additional item to the user inventory.

15. A system comprising:
   one or more processors; and
   a memory that stores one or more computer-executable instructions that are executable by the one or more processors to cause the system to perform operations comprising:
   receiving a query on a selected item associated with a user account;
   accessing user data associated with the user account;
   pre-computing a trust score from the user data;
   determining, based at least in part on the trust score, a streamlined buyback limit for the user account;
   determining user inventory based at least in part on the user data;
   determining assessed values associated with one or more tradable items from the user inventory;
   determining a first buyback offer for a first tradable item from the user inventory based at least in part on the streamlined buyback limit, a first assessed value of the assessed values, and the first tradable item satisfying a first opportunity criterion, the first tradable item having a first relevancy to the selected item;
   determining a second buyback offer for a second tradable item from the user inventory based at least in part on the streamlined buyback limit, a second assessed value of the assessed values, and the second tradable item satisfying a second opportunity criterion, the second tradable item having a second relevancy to the selected item;
   determining a third buyback offer for a third tradable item from the user inventory based at least in part on a third assessed value of the assessed values and the third tradable item satisfying a third opportunity criterion, the third tradable item having a third relevancy to the selected item;
   determining locations for buyback offers based at least in part on the first relevancy, the second relevancy, and the third relevancy to the selected item, the buyback offers including the first buyback offer, the second buyback offer, and the third buyback offer;
   generating a user interface to present the buyback offers at the locations, the user interface presenting a reduced price for the selected item based at least in part on the buyback offers and the streamlined buyback limit, the user interface presenting a control to accept one or more of the buyback offers and purchase the selected item at the reduced price; and
   refraining from presenting the third buyback offer in the user interface based at least in part on space constraints associated with the user interface and the streamlined buyback limit.

16. The system as recited in claim 15, wherein the user interface presents the buyback offers with the first tradable item at a first location and the second tradable item at a second location, the first location being a more prominent location than the second location based at least in part on the first relevancy is higher than the second relevancy.

17. The system as recited in claim 15, wherein the first opportunity criterion is determined based at least in part on:
   analyzing at least one of the user data or item data associated with the first tradable item; and
   training a machine learning model using training data to correlate input tradable items to opportunity criteria and to determine weights associated with the opportunity criteria, the training data including a data set related to at least one of the user data or the item data, and the opportunity criteria indicating predictors associated with increased buyback selections.

18. The system as recited in claim 15, wherein the user inventory includes previously purchased items and received user-input items associated with the user account.

19. The system as recited in claim 18, wherein the user inventory further includes at least one learned item, the at least one learned item determined by:
   performing clustering on the previously purchased items and the received user-input items; and
   predicting that the at least one learned item has been purchased by the user account based on the clustering.

20. The system as recited in claim 15, wherein determining the streamlined buyback limit is based at least in part on a difference between the trust score and a predetermined trustworthy threshold.

* * * * *